United States Patent [19]

Johne et al.

[11] Patent Number: 4,467,679
[45] Date of Patent: Aug. 28, 1984

[54] TOOL HEAD

[76] Inventors: Frank Johne, Hopener Strasse 24, Lohne, Fed. Rep. of Germany, D-2842; Hans G. Hartkamp, Nordstrasse 40, Beckum, Fed. Rep. of Germany, D-4720; Hans-Georg Burmester, Suarezstrasse 8, Berlin 19, Fed. Rep. of Germany, D-1000

[21] Appl. No.: 397,244

[22] Filed: Jul. 12, 1982

[30] Foreign Application Priority Data

Jul. 16, 1981 [DE] Fed. Rep. of Germany ....... 3128047

[51] Int. Cl.$^3$ ............................................. B23B 29/10
[52] U.S. Cl. .................................... 82/36 R; 408/150
[58] Field of Search ................... 82/36 R; 407/11, 93; 408/146, 147, 150, 151, 179, 181, 185, 197, 198; 403/4, 351, 408, DIG. 7, 409

[56] References Cited

U.S. PATENT DOCUMENTS

| | | | |
|---|---|---|---|
| 1,273,752 | 7/1918 | Ebert | 408/179 |
| 1,392,304 | 10/1921 | Davis | 408/179 |
| 2,459,416 | 1/1949 | Davis | 408/147 |
| 2,833,169 | 5/1958 | Briney et al. | 408/151 |
| 2,991,667 | 7/1961 | Williams | 408/151 |
| 3,552,757 | 1/1971 | Salters | 408/198 |

Primary Examiner—Leonidas Vlachos
Assistant Examiner—William E. Terrell
Attorney, Agent, or Firm—Holman & Stern

[57] ABSTRACT

A tool head, in particular for turning and boring operations, comprises a base, an eccentric sleeve disposed therein, and a tool holder whose rearward portion engages in the eccentric bore of the eccentric sleeve, has a mounting for a tool, and may be displaced relative to the base, and secured in the position set. The eccentric sleeve forms a setting member rotatably mounted in the base and has a peripheral portion located between a front contact surface of the base and a support surface of the tool holder. The tool holder is guided so as to be non-rotatable relative to the base but displaceable transversely. An abutment for one part of a clamping device is provided on the base so that it is non-rotatably connected thereto or formed thereby. The clamping device clamps the tool holder at its support surface to the base at the contact surface thereof, also clamping the peripheral portion of the eccentric sleeve.

13 Claims, 7 Drawing Figures

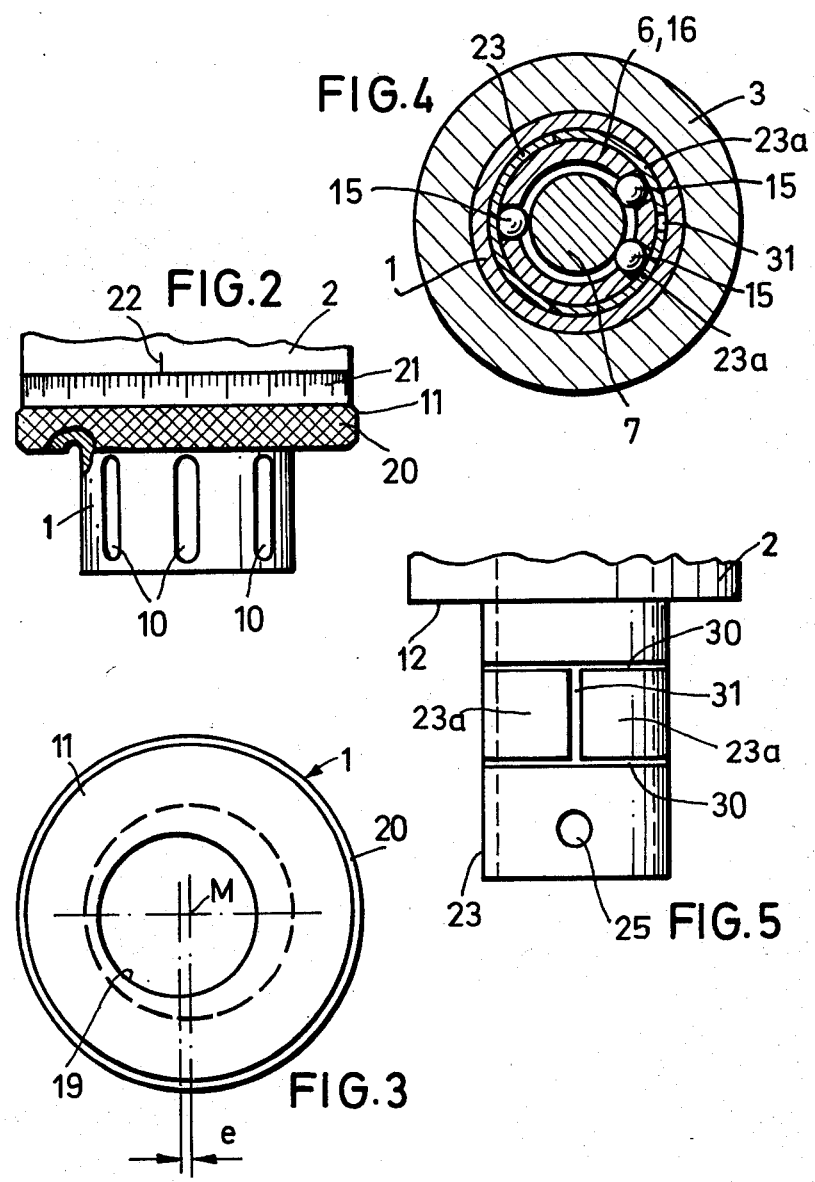

TOOL HEAD

BACKGROUND OF THE INVENTION

1. Field Of The Invention

The invention relates to a tool head, in particular for turning and boring operations, with a base, an eccentric sleeve disposed therein, and a tool holder whose rearward portion engaged in the eccentric bore of the eccentric sleeve and which tool holder comprises a mounting for a tool, may be displaced relative to the base, and may be secured in the position set.

2. Description Of The Prior Art

In fine boring it is known to provide an eccentric sleeve in a tool spindle or in a part which is used in such a spindle and may be regarded as a base, which sleeve rests via conical surfaces against the base and is non-rotatably connected to it as shown in German Pat. Nos. 669 105 and 713 620. The tool holder may be rotated in the off-center bore of the eccentric sleeve for setting the tool and it may be secured in the respective position by means of an axial tightening rod with a nut. In a device of this type it is therefore only possible to set the tool by rotating the tool holder about its longitudinal axis, the angular position of the tool cutting edge changing with respect to the spindle or the base. This can have very disadvantageous consequences. Precisely in the case of the small delivery or feed amounts which are involved in the case of tools of this type, the errors and inaccuracies inherent in a spindle system, a holding device, or the like, may distort the adjustable rotation in such a way that the actual feed of the cutting edge deviates from the desired one in a completely uncontrollable manner.

BRIEF SUMMARY OF THE INVENTION

It is the object of the invention to overcome existing disadvantages and inadequacies and to provide a tool head which enables a tool holder to be set simply and accurately, without the angular relation between the tool holder and the base, or a spindle accommodating the latter, having to be altered. In this connection it should be possible for the tool head to be set on many sides and to be constructed both for rotating and for stationary operations. Furthermore, in particular, it should also be possible to design the tool head so that it is compact and enclosed or even sealed and, moreover, to adapt its outer shape well to the requirements in each case, namely even to construct it completely round on the exterior. Further problems connected with all the above and with which the invention is concerned will appear from the explanation in each case of the solution provided.

In a tool head of the initially mentioned type the invention provides that the eccentric sleeve forms an adjustment member which is mounted rotatably in the base and comprises an edge portion located between a front contact surface of the base and a support surface of the tool holder, and that the tool holder is guided such that it is non-rotatable with respect to the base but displaceable transverse to the longitudinal axis of the base, an abutment for a part of a clamping device being provided on the base, which abutment is non-rotatably connected to the base or is formed thereby and it being possible for the tool holder to be clamped by means of this clamping device at its support surface to the base at the contact surface thereof, incorporating the edge portion of the eccentric sleeve.

A tool head of this type is characterized by a number of important advantages. Since the eccentric sleeve is located in an, as it were, play-free manner between the base and the tool holder is the adjustment member, which alone is rotated, the angular co-ordination between the tool holder and the base or a machine spindle remains unaltered from the outset irrespective of the particular setting, so that sources of errors which would otherwise be possible are eliminated. A simple, easily-readable scale may be provided, as a result of which the risk of setting errors is avoided. Owing to the surfaces which extend to the outer contour and are pressed rigidly against one another after setting has occurred in the case of axial clamping, the tool holder forms a rigid unit with the base such that all stresses expected with such a tool head may be reliably absorbed. The tool head may be so constructed that the parts important for setting and clamping are completely protected and the entire head is sealed in the operating state such that no particles of dirt may penetrate it during operation. In addition, there is the advantageous possibility of an internal cooling and/or lubricating system.

The transverse guiding of the tool holder, which suitably forms simultaneously a safety device against rotation, may be independent of the abutment associated with the clamping device. In an advantageous development, however, the abutment also forms a transverse guide for the tool holder.

A transverse pin may be provided in the base as an abutment or as an abutment and transverse guide; as a result a construction which is very simple but nevertheless reliable and accurate results.

The tool holder may be provided with an inner cavity in which important parts may be located such that they are protected.

The force for the axial clamping may be applied in various ways, for example with a clamping spindle or the like. Advantageously the clamping device comprises a wedge-shaped or conical force-applying member which cooperates with a corresponding countersurface and is to be suitably operated by means of a threaded part. The invention in particular provides a clamping body with a conical transverse bore in which a cone may be displaced by means of a screw which engages in a thread in the tool holder.

The tool holder may be clamped both axially and radially with respect to the body. In an advantageous development the tool holder additionally comprises a part which is resiliently deformable in the radial direction or is radially expansible and may be stressed by elements arranged in the interior thereof. This part is advantageously located in a region of the tool holder surrounded by the eccentric sleeve.

The resilient deformability, which, owing to the areas of tool holder, eccentric sleeve, and base which fit accurately into one another, need only be in the region of hundredths of millimeters, may be obtained by suitable selection of the wall thickness. In addition the tool holder may be slotted once or several times in order thereby to obtain favorable deformability or expansibility. An H-shaped slot arrangement which produces expansible flaps is advantageous.

In a simple and effective development, spheres which are supported on a conical surface are provided for the internal stressing of the part used for radial clamping, the mounting of these spheres being displaceable with respect to the conical surface by means of an axially movable clamping body. An arrangement of three spheres is very advantageous, in particular in such a way that two of the three spheres are associated with resiliently expansible regions of the tool holder whilst the third sphere is arranged diametrically opposite. In this connection, in the clamped state there is always the same position defined between the tool holder and the base.

The force for the axial clamping and for the radial clamping of the tool holder with respect to the basic holder may in each case be applied separately and also in different ways. In a particularly advantageous embodiment a common force-applying member is provided for the axial and radial clamping. In the manner already explained this member may in particular be wedge-shaped or conical.

The tool head may advantageously be provided with a passage-way for a cooling and/or lubricating medium which acts upon the tool or may also be used to cool the interior of the head itself.

BRIEF DESCRIPTION OF THE DRAWINGS

The invention will now be described in greater detail with reference to the accompanying drawings wherein:

FIG. 2 is an elevational view of the eccentric sleeve;

FIG. 3 is top plan view corresponding to FIG. 2;

FIG. 4 is a cross-sectional view taken along line IV—IV in FIG. 1;

FIG. 5 is an elevational view of the neck portion of the tool holder with slot arrangement;

DESCRIPTION OF PREFERRED EMBODIMENTS

Figure 1:
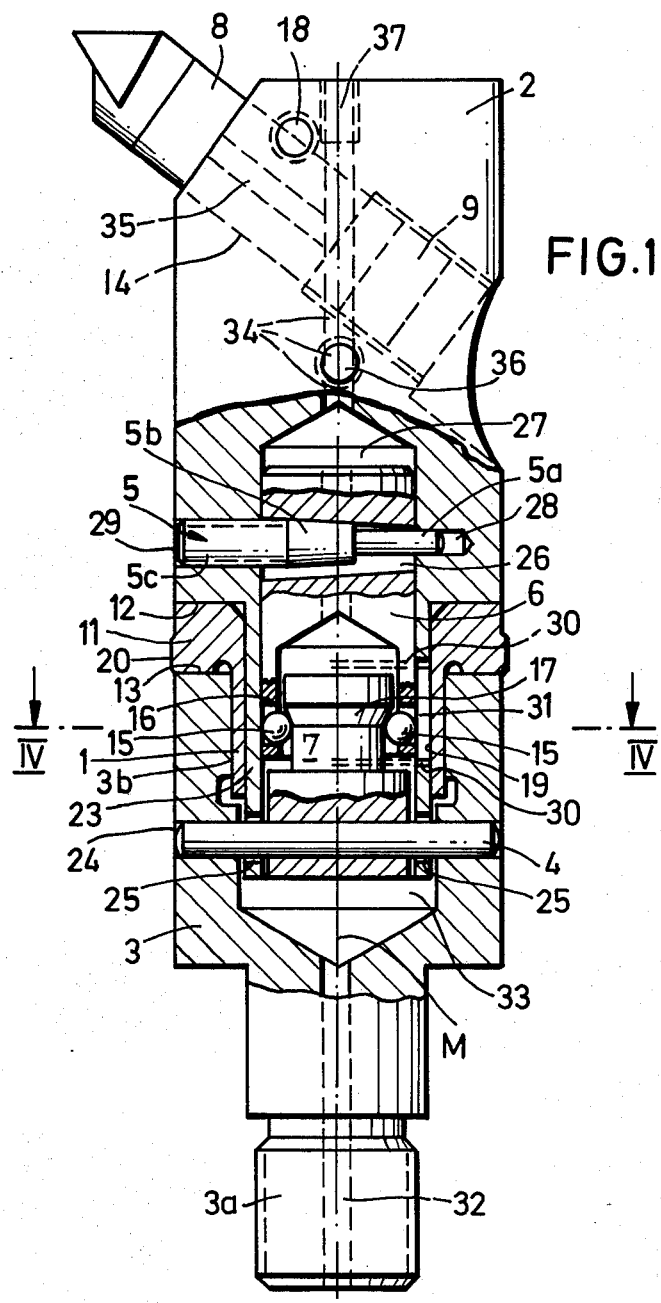
FIG. 1 is an elevational view of a tool head, partially in longitudinal cross-section according to the invention.

The tool head shown in FIGS. 1 to 5 comprises a tool holder 2 which is supported by and may be clamped to a base 3. The outer design of the base 3 may be adapted to the requirements in each case and may, for example, comprise a threaded attachment 3a by means of which it may be secured in a main spindle of a machine tool or some other holding device. The tool head may be used for rotating and for stationary operations. The tool holder 2, in the embodiment according to FIG. 1, comprises an obliquely directed mounting 14 for a tool 8, for example a turning tool, boring tool, or the like provided with an indexable insert or the like. Numeral 9 designates a setting screw for rough setting the tool 8 and numeral 18 designates a clamping screw for the tool.

The base 3 accommodates the cylindrical portion of an eccentric sleeve 1 in a cylindrical bore 3b in a manner free from play, i.e. such that it fits accurately and only allows the eccentric sleeve to rotate in the non-clamped state of the head. The eccentric sleeve comprises at the front a flange-like peripheral rim portion 11 which is located between a front contact surface 13 of the base 3 and a support surface 12 of the tool holder 2 which in this embodiment is formed by a shoulder-like step of the tool holder 2. On the exterior the rim portion 11 of the eccentric sleeve 1 is provided with a knurling 20 allowing a good hand-hold as well as with a scale 21, with which there is associated a mark 22 on the outer side of the adjacent part of the tool holder 2, as can be seen in particular in FIG. 2.

In its part extending into the base 3 the eccentric sleeve 1 is provided with a plurality of slot-like apertures 10 distributed over the periphery, the purpose of which will be described hereinafter.

In the interior the eccentric sleeve 1 comprises an eccentric bore 19 offset with respect to the central axis M of its outer cylinder surface by the amount e (cf. FIG. 3), in which bore 19 a cylindrical neck portion 23 of the tool holder 2 engages with an accurate fit, i.e. virtually without play. A transverse pin 4, inserted in a bore 24 of the base 3, engages through two bores 25 in the neck portion 23 of the tool holder 2. This transverse pin 4 holds the tool holder 2 so that it is nonrotatable with respect to the base 3 and simultaneously forms a transverse guide for the tool holder 2 in its displacement which is to be actuated by rotating the eccentric sleeve 1. FIG. 1 shows play between the transverse pin 4 and the bores 25 in the neck portion 23, which is exaggerated for the sake of clarity. This play is actually only as great as the adjustment range for the tool requires, determined by the size and position of the eccentricity e of the eccentric sleeve 1. If the maximum fine adjustment range is 0.2 mm, as is possible in the case of this type of tool head, this corresponds to the eccentricity $e = \pm 0.1$ mm, and the play of the transverse pin 4 in the bores 25 on the neck portion 23 transverse to the axis of the transverse pin need only be slightly greater than 0.1 mm, when the eccentricity in the end setting points, 180° apart, is in each case in the axial direction of the transverse bore, which results in the adjusting path precisely of 0.2 mm in this direction.

In the embodiment shown, the transverse pin 4 forms at the same time an abutment for a clamping device which to a large extent is housed in a cavity 27 of the tool holder 2, by means of which clamping device the tool holder 2 may be rigidly secured relative to the base 3 after setting has been carried out. In addition, an anchoring member 7 is mounted on the transverse pin 4 and tensioned by the tool holder 2 in order thereby to bring about the clamping. There are several possibilities for this. In the advantageous embodiment shown, a displaceable clamping member 6 with a conical bore 26 is provided in the cavity 27 of the tool holder 2, in which bore 26 an actuating member 5 engages. The member 5 comprises a front pin 5a, guided in a bore 28 of the tool holder 2, a conical central portion 5b, and an end portion 5c formed as a screw and located in a threaded bore 29 in the tool holder 2.

The clamping member 6 and the anchoring member 7 may be rigidly connected, i.e. both parts may form one piece. In the embodiment shown, however, the ends of the clamping member 6 and the anchoring member 7 which face each other are constructed in a particular manner in order to obtain both axial and radial clamping with respect to the base 3 with one single actuating member 5. The rear part of the clamping member 6 is constructed as a holding device 16 for three spheres 15 which may be supported on a conical surface 17 on the anchoring member 7 and may outwardly rest against the inner side of the neck portion 23 of the tool holder 2.

If the screw 5c is tightened, the cone 5b bears against the conical bore 26 and thereby urges the clamping member 6 towards the front, i.e. in the direction towards the tool 8. Via the spheres 15, which thus rest rigidly against the conical surface 17 of the anchoring member 7, the anchoring member 7 is urged against the transverse pin 4 forming the abutment, as a result of which the support surface 12 of the tool holder 2 is pressed against the front surface of the rim portion 11 of the eccentric sleeve 1 and the lower side of the rim portion 11 is pressed against the contact surface 13 on the base 3, so that the tool holder, with the inclusion of the rim portion 11 of the eccentric sleeve 1, is rigidly clamped with the base 3 in the axial direction.

At the same time, however, the spheres 15 also exert radial stress on the neck portion 23 and urge it against the surrounding part of the eccentric sleeve 1 and this in turn against the bore 3b of the base 3, as a result of which the tool holder 2 is also radially clamped with the base 3. This is brought about by means of the single actuating member 5.

It is suitable to construct the neck portion 23 of the tool holder 2 so that it is expansible in the area in which the spheres 15 engage. This is done by suitable selection of the wall thickness, and/or by the arrangement of one or more slots. As can be seen from FIGS. 1, 4, and 5, advantageously two slots 30, which extend approximately over half the periphery of the neck portion 23, and one slot 31, perpendicular to the slots 30, are provided so that the neck portion 23 forms two expansible flaps 23a at this point. The previously mentioned slots 10 in the eccentric sleeve 1 likewise facilitate a certain deformation when clamping force is applied. A resilient deformation of this type may be within the range of one or more hundredths of a millimeter.

The arrangement of the spheres 15 is advantageously such that two spheres act upon the flaps 23a, while symmetrically opposite a single sphere is present and defines the point of force transmission. It is thereby reliably ensured that the radial clamping of the tool holder 2 with the base 3 always takes place in the same direction and, for this reason, the same defined contact point is given.

When clamping is released, which occurs by lightly slackening back the screw 5c, the desired fine adjustment of the tool 8 may be made simply and rapidly by rotating the rim portion 11 of the eccentric sleeve 1, whereby it is possible to read accurately the scale 21, which extends at least over half the periphery. After setting, the position set is fixed by means of one single actuating member, namely the screw 5c, with rigid clamping of the parts to one another such that they from a rigid unit.

In addition, the tool head may be equipped with a passage, which in particular leads from the rear end to the tool, for guiding a fluid medium through the tool head, so that in an advantageous manner it is possible to cool or lubricate the tool or the working region and also to cool the interior of the head itself. In the embodiment according to FIG. 1 a duct 32 extends through the rearward part of the base 3 to an inner cavity 33 thereof which merges with the cavity 27 of the tool holder 2. From there a duct 34, which if necessary is bent twice, leads with a continuation 35 to the upper side of the clamped tool 8. Two sealing screws for the ends of the duct bores are designated 36 and 37.

Since the tool head is completely sealed as a result of the contact of all the parts 1, 2, 3 which form the outer surfaces, there can be no pollution of its interior nor can cooling medium or the like escape at undesired points.

Figure 6:
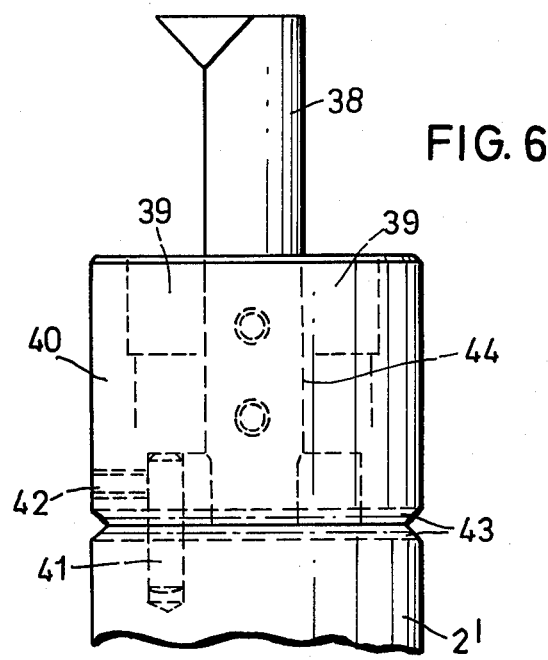
FIG. 6 is an elevational view of the front part of an alternative embodiment of a tool head according to the invention.
Figure 7:
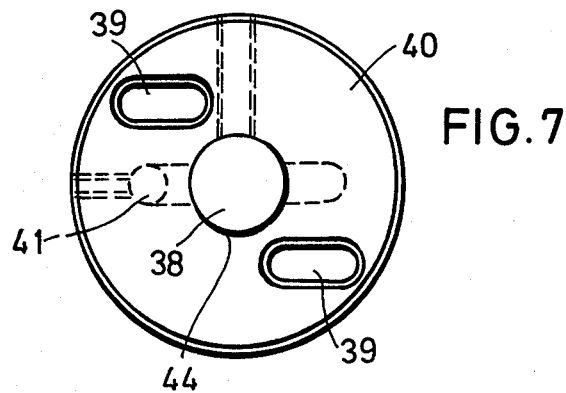
FIG. 7 is top plan view corresponding to FIG. 6.

FIGS. 6 and 7 show that the tool head may also be arranged for operating with an axially projecting tool 38 which is secured in a mounting 44. A tool holder 2', only the front end of which is shown, comprises on the front end a ground toothing 43 which has a counter-toothing on an attachment 40. In addition, the tool holder 2' is constructed as is explained above for the tool holder 2. The attachment 40 may be displaced along the toothing 43 for rough setting and clamped in the desired position with the holding device 2' by screws engaging through elongate holes 39. A fitting pin 41 is acted on by a screw 42.

The fine setting of the tool 38 occurs in the manner explained in connection with FIGS. 1 to 5 with the means shown therein.

We claim:

1. A tool head comprising:
   a base member adapted to be attached at one end to a machine tool;
   a contact surface on the other end of said base member;
   a cylindrical bore in said base member open at said other end;
   a cylindrical sleeve rotatably supported in said bore;
   a flange on said sleeve slidably engaging said contact surface on said base member;
   a cylindrical eccentric bore in said sleeve having its central axis eccentric to the axis of said cylindrical bore in said base member;
   a tool holder having one end in said eccentric bore and having a tool mounting means at the other end;
   means to prevent relative rotation and allow relative transverse displacement between said tool holder and base member;
   a support surface on said tool holder slidably engaging said flange on said eccentric sleeve;
   said flange being disposed between said contact surface on said base member and said support surface on said tool holder;
   axial clamping means operatively mounted within said tool holder to clamp said tool holder and eccentric sleeve to said base member to prevent relative axial displacement thereof;
   means for actuating said axial clamping means; and
   radial clamping means operatively disposed within said cylindrical bore in said base member to clamp said tool holder and eccentric sleeve to said base member to prevent relative rotation thereof in response to actuation of said axial clamping means.

2. The tool head as claimed in claim 1 wherein said means to prevent relative rotation and allow relative transverse displacement between said tool holder and base member comprises a cylindrical sleeve on said tool holder extending into said bore in said base member, and an abutment means in said base member operatively engaging said tool holder sleeve so that said abutment means forms a transverse guide for said tool holder.

3. The tool head as claimed in claim 2 wherein said abutment means comprises a pin member extending transversely in said base member, and transverse holes are provided in said tool holder sleeve through which said pin member slidingly extends.

4. The tool head as claimed in claim 3 wherein said axial clamping means further comprises a cavity in said tool holder, a clamping element mounted for axial displacement in said cavity, a transverse conical bore in said clamping element, a transverse threaded bore in said tool holder, a screw member operatively engaging in said threaded bore, and a conical portion on said screw disposed within and cooperatively engaging said conical bore in said clamping element so that rotation of said screw axially displaces said clamping element.

5. The tool head as claimed in claim 2 wherein said tool holder sleeve and said eccentric sleeve have radially resiliently deformable portions and said radial clamping means comprises radially movable elements engageable with the inner surface of said tool holder sleeve and means to move said elements radially outwardly upon actuation of said axial clamping means.

6. The tool head as claimed in claim 5 and further comprising slots in said tool holder sleeve in the region thereof within said eccentric sleeve to provide said radially resiliently deformable portions on said tool holder sleeve.

7. The tool head as claimed in claim 6 wherein said slots comprise two spaced circumferential slots and a substantially axially directed slot interconnecting said two slots to form two resiliently deformable portions.

8. The tool head as claimed in claim 7 and further comprising slots in said eccentric sleeve.

9. The tool head as claimed in claim 5 wherein said axial clamping means comprises a clamping element mounted in said tool holder for axial displacement with respect thereto, means to axially displace said clamping element, said radially movable elements comprise spheres supported in said clamping element, and said means to move said elements radially outwardly comprises a conical surface fixed with respect to said base member and operatively engaging said spheres so that axial displacement of said clamping element toward the axial clamping position drives said spheres radially outwardly.

10. The tool head as claimed in claim 9 wherein said spheres comprise three spheres, two said radially resilient deformable portions are provided on said tool holder sleeve, two of said spheres operatively engage said deformable portions, and a third sphere is disposed substantially diametrically opposite the region between said two spheres.

11. The tool head claimed in claim 1 and further comprising a cavity in said tool holder, and wherein said axial clamping means comprises a clamping element mounted for axial displacement in said cavity and means operatively engaging said axial clamping means with said base member with said base member and a tapering force applying means operatively disposed between said clamping element and said tool holder to axially displace said clamping element and tool holder with respect to each other.

12. The tool head as claimed in claim 11 wherein said force applying means comprises a transverse conical bore in said clamping element, a transverse threaded bore in said tool holder, a screw member operatively engaging in said threaded bore, and a conical portion on said screw disposed within and cooperatively engaging said conical bore in said clamping element so that rotation of said screw axially displaces said clamping element.

13. The tool head as claimed in claim 11 wherein, said tool holder sleeve and said eccentric sleeve are radially resiliently deformable and said radial clamping means comprises a sleeve portion on said clamping element slidably disposed within said tool holder sleeve, a plurality of holes in said clamping element sleeve portion, spheres supported in said hole for radial movement therein, means mounted on said means to prevent relative rotation for moving said spheres radially, a conical surface portion on said moving means within said clamping element sleeve portion operatively engaging said spheres, so that actuation of said tapering force applying means toward the clamping portion displaces said clamping element axially and said spheres radially outwardly by said conical surface portion to radially deform said tool holder sleeve and said eccentric sleeve into clamping engagement with said base member.

* * * * *